United States Patent [19]
Ward

[11] Patent Number: 5,087,273
[45] Date of Patent: Feb. 11, 1992

[54] AIR FRESHENING DEVICE

[75] Inventor: Lacy D. Ward, Midland, Tex.

[73] Assignee: Ward Products, Inc., Midland, Tex.

[21] Appl. No.: 609,244

[22] Filed: Nov. 5, 1990

[51] Int. Cl.[5] .............................. B01D 39/04
[52] U.S. Cl. ........................ 55/279; 55/387;
55/515; 239/55; 239/57; 239/60; 422/5;
422/122; 422/124
[58] Field of Search ............. 55/279, 387, 493, 508,
55/515; 239/54, 55, 57, 60; 422/5, 122, 123, 124

[56] References Cited

U.S. PATENT DOCUMENTS

| | | | |
|---|---|---|---|
| 1,769,409 | 7/1930 | Armstrong | 239/57 X |
| 2,738,224 | 3/1956 | Turner et al. | 239/57 |
| 3,784,102 | 1/1974 | Stults | 239/57 X |
| 3,902,877 | 9/1975 | Swaim | 55/490 |
| 4,065,262 | 12/1977 | Petroft | 21/74 |
| 4,118,226 | 10/1978 | Bourossa | 55/279 |
| 4,257,787 | 3/1981 | Taylor | 55/279 |
| 4,306,892 | 12/1981 | Attolla et al. | 55/279 |
| 4,315,837 | 2/1982 | Rourke et al. | 422/122 X |
| 4,563,333 | 1/1986 | Frigon | 422/122 |
| 4,604,114 | 8/1986 | Ward | 55/279 |
| 4,614,299 | 9/1986 | Van Loveren et al. | 239/60 X |
| 4,913,942 | 4/1990 | Jick | 55/387 X |

Primary Examiner—Charles Hart
Attorney, Agent, or Firm—Hubbard, Thurman, Tucker & Harris

[57] ABSTRACT

An air freshening device used in conjunction with an air circulation system of a business or residential building for impregnating the air with an aromatic scent. The device comprises a rectangular envelope made out of an air permeable synthetic mesh containing a plurality of aromatic beads. The envelope has a fastener at one corner. It is affixed to the internal conduit of the air circulation system, preferably to the main air filter for the system. As air passes through the air permeable envelope, the aromatic beads volatize, saturating the air with a fragrant scent. The air is then transferred throughout the building via the normal conduit or duct system.

12 Claims, 1 Drawing Sheet

5,087,273

AIR FRESHENING DEVICE

BACKGROUND OF THE INVENTION

This invention relates to air treatment in air circulation systems and, more particularly, to a disposable envelope or packet which contains a quantity of air freshening material. The envelope may be easily attached to any one of a number of different types of air filters customarily used in air circulation systems, or to other points inside the air circulation conduit system.

In both residential and commercial structures, there has been an increasing demand to use forced air heating and cooling systems that act to recirculate the air inside of the structures. This type of recirculation, while increasing the efficiency of the heating or cooling systems, restricts the turnover of air from the interior to the exterior of the structures. As a result, the air within the structure becomes stale.

To combat this problem, many in the market have turned to solid or liquid aromatic air fresheners, or aerosol air fresheners. However, because their disbursement is restricted, these fresheners are generally limited to the air space in close proximity to them. This reduces their overall effectiveness.

It has been recognized that air freshening is better accomplished by the incorporation of an air freshener inside the air circulation system, since such placement results in distribution of the aromatic throughout the enclosed structure. Several inventions have related to combining into a single product an aromatic material with the air circulation filter. In this respect, see U.S. Pat. No. 4,604,114, wherein the air filter contained solid rods of fragrant scented material embedded in the pad of the filter. See also U.S. Pat. No. 4,118,226, wherein the aromatic is made an integral part of the air filter by banding the aromatic to the perimeter of the filter, and then securing the aromatic with the support casing of the filter; and U.S. Pat. No. 4,065,262 issued to Petroff on Dec. 27, 1977 wherein an air filter combined with a plurality of containers holding a quantity of air freshener composition in the air filter. The containers are selectively opened to allow air flow through them.

These types of air filter-aromatic combinations have presented several difficulties for the air freshener industry. First, by the very nature of the combination, they require the user to purchase these special filter-aromatic combinations in lieu of standard filter types available at most hardware centers. The lack of availability of such filter combinations detracts from the convenience to the end user, and thus from their marketability. In addition, such filter combinations require the user to replace the entire filter "system" when either the aromatic material is spent, or when the useful life of the filter element is at an end, whichever comes first, or when the user wishes to change fragrances. This results in economic waste.

From a manufacturers standpoint, there are other problems presented by prior art practice. First, such combination filters required a manufacturer to greatly multiply his inventory of filtering systems. More specifically, the manufacturer has to multiply the number of filters in each size he desires to keep in stock, by the number of different fragrances he wants to offer to his customers. For example, if a manufacturer wanted to market 4 different aromatic fragrances, he would have to have 4 different filter systems for each size filter. If he made 60 different sizes of filters, which is typical in the air filter industry, he would now have to manufacturer 240 filter systems, instead of 60. In addition, unless the filter combination is sealed in some sort of package, the aromatic will volatize and become unless before it reaches the end user. This packaging, along with the added cost of manufacturing, presents cost barriers that buyers have not been willing to accept.

Other inventions have related to a container that holds an aromatic, and attaches itself to the filter in the air circulation system. In this respect, U.S. Pat. No. 4,563,333, provides an envelope of perforated cardboard with a deodorizing insert is attached to the corner of a filter with adhesive backed tabs. See also U.S. Pat. Nos. 3,902,877 and 4,028,073, wherein a perforated disc shaped container encloses a cake of aromatic material, and attaches itself to one of the circular openings in an air filter.

While such deodorizing devices help to alleviate the problem of offensive odors through the use of an air circulation system, several problems are inherent in their design. First, such devices are generally made out of a material that is not air permeable, i.e., they require perforations to be cut into them to allow for air flow. As a result, their placement onto an air filter reduces the overall efficiency of the heating or cooling system by blocking a portion of the air coming through the system. Second, the placement of such devices is limited to particular areas of the filter, thus reducing the users choice of optimum placement for his air circulation system. Third, the attachment mechanisms are restrictive to certain types of air filters, thus limiting their use in other filtering systems required for other air circulation systems. Fourth, since the installation of the device required some modification to the filter, removal of the device is destructive, requiring replacement of the filter. Fifth, the containers are only capable of storing aromatic material of the solid cake or sheet type. This restricts the choice of aromatic the consumer may desire to use.

SUMMARY OF THE INVENTION

In view of the above, it is an object of the invention to provide a conveniently disposable air freshener for use in a central air circulation system.

It is a further object of this invention to provide an air freshener for use in a central air circulation system that is independent or separate from the air filter, but can be easily attached to the filter.

It is yet a further object of this invention to provide an air freshener that can be replaced independent of the air filter, without damaging the air filter.

Still another object of this invention is to provide an air freshener envelope containing an aromatic material that is air permeable, allowing for maximum air flow to the aromatic material, and for minimum interference to the air circulation system.

It is another object of the invention to provide an air freshener envelope that is capable of containing different types of aromatic material, including a plurality of scented particulate beads.

The exemplary embodiment achieves the above mentioned objects through the use of an air permeable multi-threaded mesh envelope that contains an aromatic composition, particularly, a plurality of scented particulate beads. The envelope may be made from a single rectangle of mesh, folded over itself in such fashion as to create a rectangle that is half the size of the unfolded piece of mesh. An aromatic material may be placed between the folds of the mesh, with the mesh then sealed on the three open sides. The sealing process forms a rectangle or envelope with the aromatic material inside.

The envelope may have at one corner an eyelet, securely affixed to the envelope, through which a fastener is attached. This fastener may then be used to secure the envelope to an air filter in the pathway of an air circulation system.

DETAILED DESCRIPTION OF THE INVENTION

Figure 1:
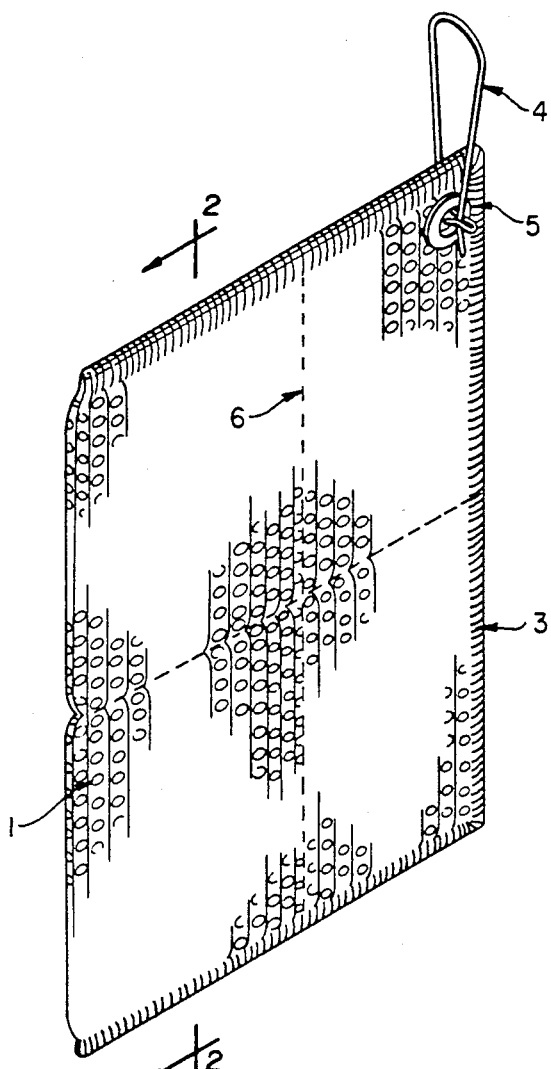
FIG. 1 is a perspective view of an air permeable envelope, along with a corner fastener.

One embodiment of the invention is illustrated in FIG. 1. A frontal view of FIG. 1 shows an envelope, made of some type air permeable 1, that is sewn or otherwise sealed around its perimeter 3. This embodiment utilizes a single sheet of synthetic mesh, folded in half, and sewn on the three open sides. The preferred synthetic mesh has an open surface area of greater than 60% which has been found to allow for significantly greater air circulation, and thus considerably better air permeation than prior air freshener enclosures.

At one corner of the envelope, a fastener or clip 4 is attached through an eyelet 5 to secure the fastener to the envelope. The fastener 4 is then used to attach the envelope to a preferred location within an air circulation system, usually a central air conditioner-heater system. One location that a user may attach the envelope is on the surface of an air filter located in the air circulation system. When so attached, the air passing through the filter, when the system is in operation, contacts and carries the aromatic, volatized into the air stream, throughout the duct work of the air circulation system. The eyelet 5 may consist of any material capable of being shaped into a ring, that is strong enough to secure the envelope inside the air circulation system. One embodiment of this invention uses a brass ring attached through the corner of the envelope.

In one embodiment of the invention, the enveloped is sectioned into a plurality of compartments by stitching 6 the opposite faces of the envelope together. This sectionalizing allows the envelope to restrict the movement of the aromatic material 7 placed within the sections. It has been found that such restriction of movement prevents the aromatic material from gathering into one location within the packet. If the material were allowed to "clump" together, the exposed surface area of the beads would be reduced, limiting the overall effectiveness of the air freshener. Thus, one embodiment of the invention prevents such "clumping" of aromatic material by creating sections within the envelope for the storage of aromatic material allowing for maximum air/aromatic contact.

Figure 2:
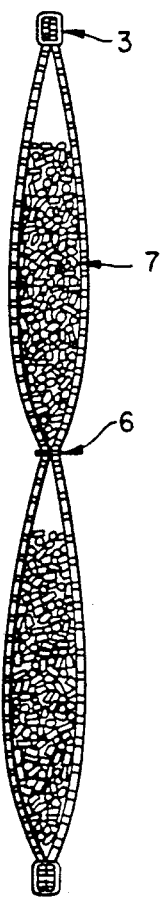
FIG. 2 is a sectional view on line 2—2 of FIG. 1.

FIG. 2 shows a cross-sectional view of the envelope in FIG. 1 along the line 2—2. Contained within the envelope is a plurality of scented particulate beads, or extruded plastic beads 7. The beads 7 are made of an ethylene vinyl acetate compound that can be scented with a variety of different aromatic fragrances (pine, lemon, vanilla, etc.). As air passes through the envelope, the beads 7 volatize, impregnating the air with an aromatic scent.

The use of extruded plastic beads 7 in an air freshening device dramatically improves the effectiveness of air freshener systems. For example the exposed surface area of hundreds of aromatic beads 7 is greater than that obtained through the use of sheets or cakes of aromatic material. This increased surface area allows for improved volatization of the aromatic, and thus greater distribution of the scent within the air circulation system.

In addition, even with this improved volitalization, the effective life of the extruded plastic beads 7 surpasses that of the solid sheet or cake material. For example, in a home that is 2000 to 2500 square feet, the blower or fan for a single service central unit in a typical air conditioner-heater system produces on the order of 1200 to 2000 cubic feet per minute of air through the air circulation system. A sheet or cake material that is placed in such a system can completely volatize within a matter of hours, and at best within a week, requiring frequent replacement. The extruded plastic beads, on the other hand, are capable of providing effective air treatment for up to a month of normal use in such a system, more than doubling the effective life of such air treatment systems.

Figure 3:
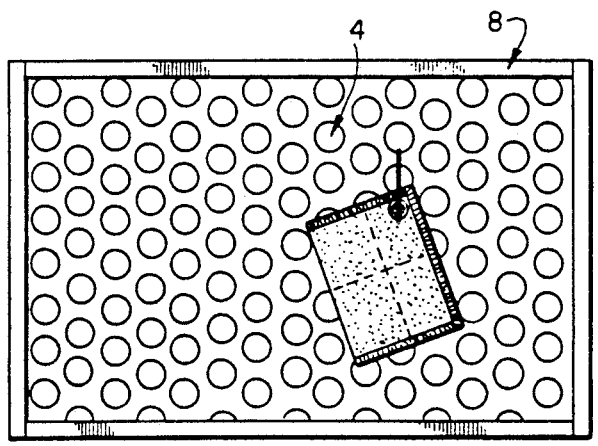
FIG. 3 is a perspective view of an air permeable envelope, attached to an air filter.

An embodiment of this invention appears in FIG. 3 which shows a perspective view of the air permeable envelope attached to an air filter 8 for use within a central air circulation system. Although the envelope may be attached anywhere within the conduit structure of the air circulation system, one possibility for attachment is directly to the outflow side of the air filter. Such placement prevents the aromatic material from becoming polluted by prefiltered contaminants, and provides a support structure for maintaining the envelope in a planar relationship to the forced air in the system.

Figure 4:
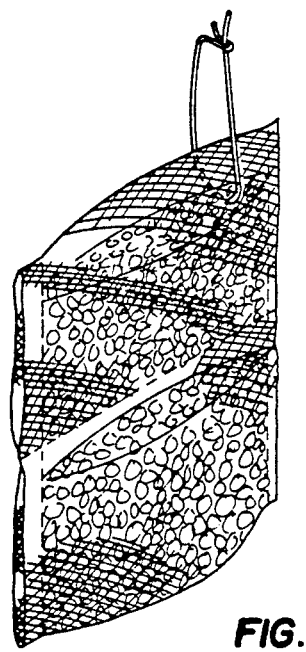
FIG. 4 is a perspective view of another embodiment of an air permeable envelope.

Another embodiment of this invention appears in FIG. 4. This embodiment shows a perspective view of an air permeable envelope, manufactured out of a plastic mesh which provides greater than 70% exposed surface area for greater air circulation. The envelope is divided into a plurality of partitions by heat sealing, or melting, the edges of the envelope together. The fastener is then threaded through the envelope to secure the envelope to a selected point within an air circulation system.

It can be seen from the foregoing that the invention provides a simple and effective means for freshening air within an air circulation system. The use of extruded plastic beads 7 as an aromatic material provides for greater longevity of the air freshening device, resulting in reduced cost to the user, and lessening the need for maintenance of the air circulation system. In addition, the mesh material that is used for the envelope is efficient at retaining the beads within the envelope, while at the same time allowing for improved circulation of air through the aromatic medium. Finally, the ease with which the air freshening envelope can be attached inside an air circulation system, allows the envelope to adapt to a variety of different systems, thus enhancing the marketability for such a device.

It can be appreciated that many changes and modifications of the invention as described herein may be made by a person skilled in the art to which this subject matter pertains without substantially deviating from the spirit and scope of the invention. Consequently, it is not the intention of the applicant to limit his invention to those modes and embodiments of the invention shown or described above, but to include those modifications, adaptations, or changes which may be so made.

I claim:

1. For use in freshening air, the combination comprising an air circulation system;
   an air filter in the circulation system;
   an air freshening material comprising a plurality of scented particulate beads;
   an air permeable envelope enclosing the air freshening material and keeping the air freshening material inside of the envelope; and
   a fastener attached at one end to the air permeable envelope adapted for securing the envelope to the air filter and comprising an eyelet ring secured to the air permeable packet and a single point fastener threaded through the eyelet ring for attaching the air freshening device to the air filter.

2. The air freshening combination of claim 1 wherein the air freshening material comprises scented extruded plastic beads.

3. The air freshening combination of claim 1 wherein the air permeable envelope comprises opposite sides of multi-threaded mesh, sealed around the perimeter so as to keep the contents inside the envelope.

4. The air freshening combination of claim 3 wherein the mesh used in the envelope has greater than 60% open surface area to allow for air penetration.

5. The air freshening combination of claim 3 wherein the envelope is separated into a plurality of partitions, each containing a portion of air freshening material.

6. An air freshening device for use in air circulating systems comprising:
   an air freshening material comprising a plurality of scented extruded plastic particulate beads;
   an air permeable envelope enclosing the air freshening material wherein the air permeable envelope comprises opposite sides of multi-threaded mesh sealed around the perimeter so as to keep the contents inside the envelope, said envelope being separated into a plurality of partitions each containing a portion of said air freshening material; and
   a fastener, attached at one end to the air permeable envelope adapted for securing the envelope inside the conductive path of the air circulation system.

7. The air freshening device of claim 6 wherein the mesh used in the envelope has greater than 60% open surface area to allow for air penetration.

8. An air filter for use in a central air circulation system, in combination with an air freshening device comprising:
   an air freshening material comprising a plurality of scented particulate beads;
   an air permeable envelope, enclosing the air freshening material and keeping the air freshening material inside of the envelope, wherein the envelope comprises opposite sides of multi-threaded mesh, sealed around the perimeter and having greater than 60% open surface area to allow for air penetration; and
   a fastener, attached at one end to the air permeable envelope adapted for securing the envelope to the filter inside the conductive path of the air circulation system.

9. The air filter combination of claim 8 wherein the air freshening material comprises scented extruded plastic beads.

10. The air filter combination of claim 8 wherein the envelope is separated into a plurality of partitions, each containing a portion of air freshening material.

11. The air filter combination of claim 8 wherein the fastener comprises:
    an eyelet ring, secured to the air permeable packet; and
    a single point fastener, threaded through the eyelet ring, for attaching the air freshening device to an air circulation system.

12. An air freshening device for use in air circulation systems comprising:
    an air freshening material comprising a plurality of scented particulate beads;
    an air permeable envelope enclosing the air freshening material wherein the air permeable envelope comprises opposite sides of multi-threaded mesh sealed around the perimeter so as to keep the contents inside the envelope; and
    a fastener attached at one end to the air permeable envelope adapted for securing the envelope inside the conductive path of an air circulation system and comprising an eyelet ring secured to the air permeable packet and a single point fastener threaded through the eyelet ring for attaching the air freshening device to an air circulation system.

* * * * *